(12) United States Patent
Yamada et al.

(10) Patent No.: US 11,922,432 B2
(45) Date of Patent: Mar. 5, 2024

(54) PREDICTION SYSTEM AND PREDICTION METHOD

(71) Applicant: TOYOTA JIDOSHA KABUSHIKI KAISHA, Toyota (JP)

(72) Inventors: Taiga Yamada, Nagakute (JP); Toru Kidokoro, Hadano (JP); Takao Iura, Toyota (JP); Takashi Shibata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 17/692,311

(22) Filed: Mar. 11, 2022

(65) Prior Publication Data
US 2022/0292523 A1 Sep. 15, 2022

(30) Foreign Application Priority Data
Mar. 11, 2021 (JP) .................. 2021-039135

(51) Int. Cl.
G06Q 30/018 (2023.01)
G06Q 50/26 (2012.01)

(52) U.S. Cl.
CPC ........... *G06Q 30/018* (2013.01); *G06Q 50/26* (2013.01)

(58) Field of Classification Search
None
See application file for complete search history.

(56) References Cited

U.S. PATENT DOCUMENTS

| 7,469,251 | B2 * | 12/2008 | Li | G06F 40/103 |
| | | | | 707/999.005 |
| 2011/0137574 | A1 * | 6/2011 | Koch | G06Q 10/10 |
| | | | | 702/24 |
| 2016/0292696 | A1 * | 10/2016 | Gong | G08G 5/0008 |

(Continued)

FOREIGN PATENT DOCUMENTS

| JP | 2004-110149 A | 4/2004 |
| WO | 2018/230616 A1 | 12/2018 |

OTHER PUBLICATIONS

Nay, John J. "Predicting and understanding law-making with word vectors and an ensemble model", published 2017, PLoS One 12 (5): e0176999. Available at: < https://doi.org/10.1371/journal.pone.0176999 > (Year: 2017).*

*Primary Examiner* — Richard W. Crandall
(74) *Attorney, Agent, or Firm* — Oliff PLC

(57) ABSTRACT

An information collection server obtains relevant information relating to legislation, regulations, or standards (vehicle emissions control) from an external server group and a local server and provides the obtained relevant information to an information processing server. When the information processing server receives the relevant information from the information collection server, it performs conversion processing on each piece of information included in the relevant information in accordance with each piece of information to convert each piece of information into an index relating to a degree of influence on revision of the emissions control. The information processing server provides each resultant index to a prediction creation server. When the prediction creation server receives each resultant index from the information processing server, it predicts a stage of revision of the emissions control based on each index.

11 Claims, 9 Drawing Sheets

| IMPORTANCE RANK | POINT | STANDARD |
|---|---|---|
| 1 | 0 | INFORMATION IRRELEVANT TO ATMOSPHERIC POLLUTION |
| 2 | 0.1 | INFORMATION ON ATMOSPHERIC POLLUTION WHICH IS NOT URGENT |
| 3 | 0.5 | INFORMATION POSING PROBLEMS OF ATMOSPHERIC POLLUTION |
| 4 | 1.5 | INFORMATION REPRESENTING SERIOUSNESS OF ATMOSPHERIC POLLUTION |
| 5 | 3.5 | INFORMATION THAT MAY LEAD TO REVISION (SUGGESTS SOME MEASURES TO BE TAKEN BY GOVERNMENT) |
| 6 | 6.0 | INFORMATION REPRESENTING POSSIBILITY OF REVISION INCLUDING RESTRICTION ON AUTOMOBILES (AUTOMOBILES INCLUDED IN TARGETS TO WHICH MEASURES TAKEN BY GOVERNMENT ARE DIRECTED) |
| 7 | 9.0 | INFORMATION REPRESENTING SPECIFIC PROPOSAL AND/OR PROPOSED SCHEDULE OF REVISION INCLUDING RESTRICTION ON AUTOMOBILES |

(56) References Cited

U.S. PATENT DOCUMENTS

2019/0108196 A1\* 4/2019 Hannula ............... G06F 16/219
2020/0117859 A1\* 4/2020 Arima .................... G06Q 50/18
2021/0165373 A1\* 6/2021 Kasinathan ............ G06Q 10/20

\* cited by examiner

ANNUAL AVERAGE VALUE Ave ($\mu$g/m3)

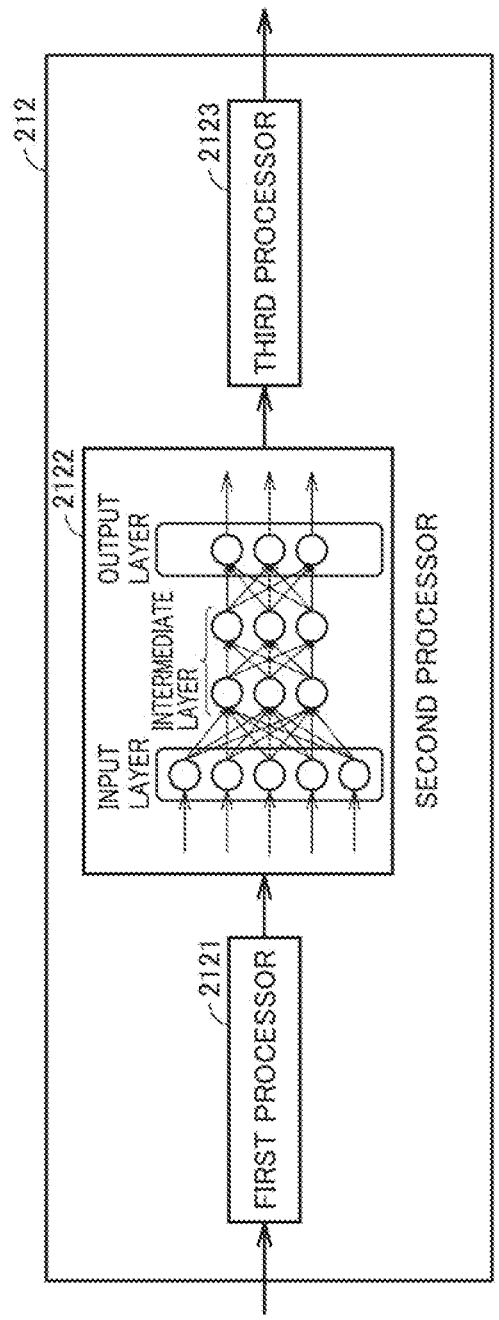

FIG.7

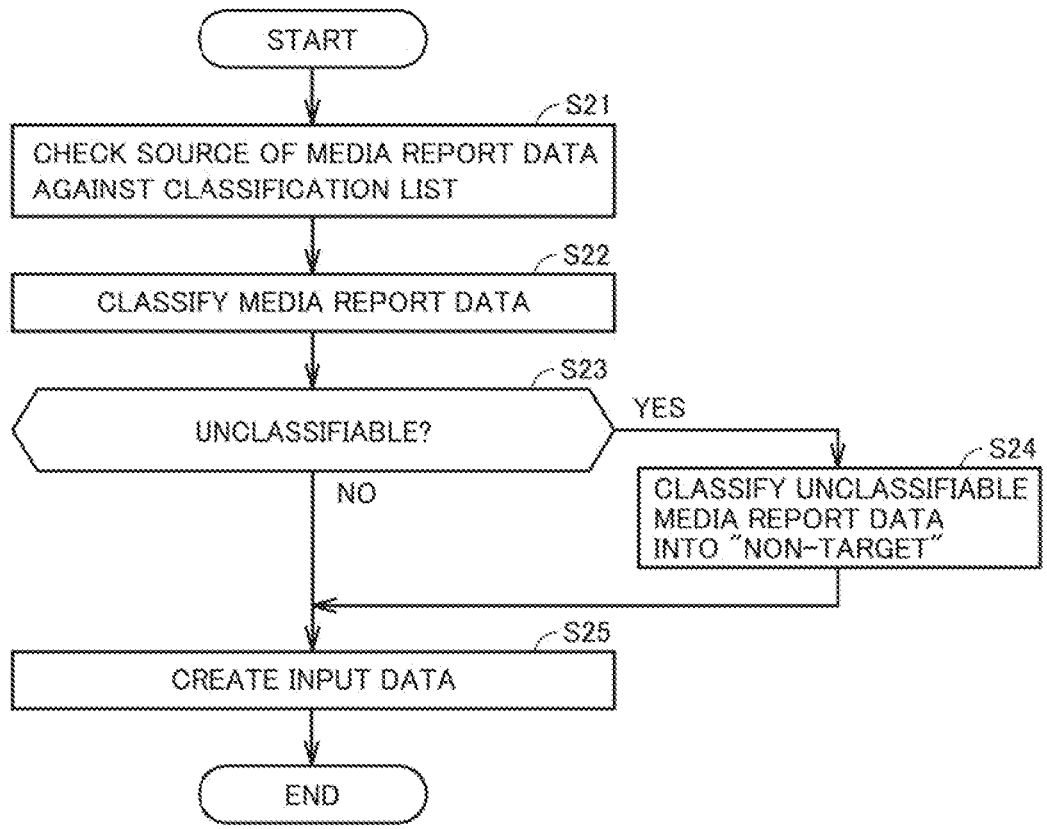

FIG.8

| IMPORTANCE RANK | POINT | STANDARD |
|---|---|---|
| 1 | 0 | INFORMATION IRRELEVANT TO ATMOSPHERIC POLLUTION |
| 2 | 0.1 | INFORMATION ON ATMOSPHERIC POLLUTION WHICH IS NOT URGENT |
| 3 | 0.5 | INFORMATION POSING PROBLEMS OF ATMOSPHERIC POLLUTION |
| 4 | 1.5 | INFORMATION REPRESENTING SERIOUSNESS OF ATMOSPHERIC POLLUTION |
| 5 | 3.5 | INFORMATION THAT MAY LEAD TO REVISION (SUGGESTS SOME MEASURES TO BE TAKEN BY GOVERNMENT) |
| 6 | 6.0 | INFORMATION REPRESENTING POSSIBILITY OF REVISION INCLUDING RESTRICTION ON AUTOMOBILES (AUTOMOBILES INCLUDED IN TARGETS TO WHICH MEASURES TAKEN BY GOVERNMENT ARE DIRECTED) |
| 7 | 9.0 | INFORMATION REPRESENTING SPECIFIC PROPOSAL AND/OR PROPOSED SCHEDULE OF REVISION INCLUDING RESTRICTION ON AUTOMOBILES |

FIG.9
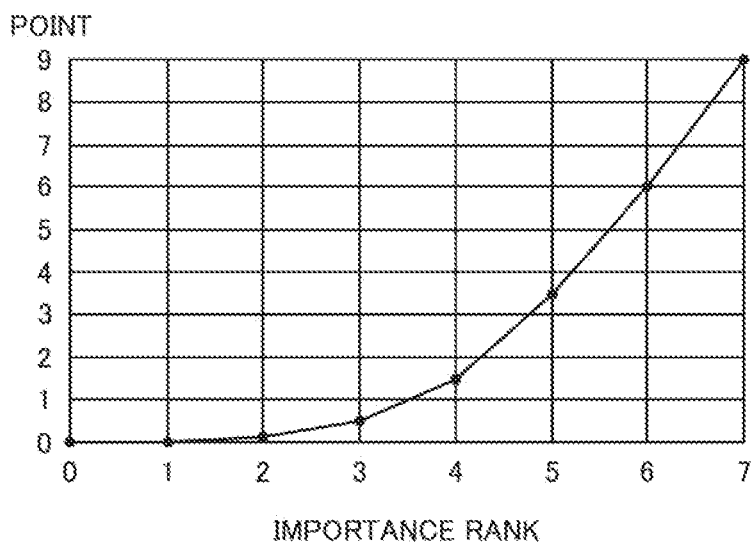
FIG.10
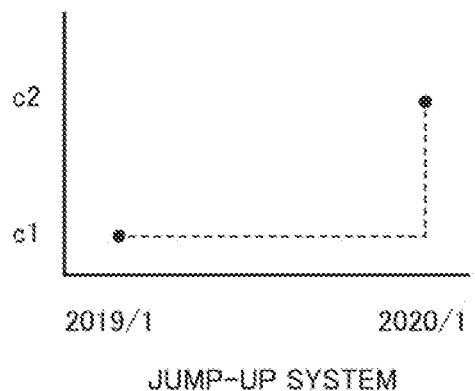
FIG.11
| PHASE | STANDARD |
|---|---|
| FIRST PHASE | NOT DISCUSSED |
| SECOND PHASE | START DISCUSSION OF REVISION |
| THIRD PHASE | ESTABLISHMENT OF WG AND START OF SPECIFIC DISCUSSION |
| FOURTH PHASE | REVISION PROPOSAL BROUGHT UP |
| FIFTH PHASE | ADOPTION |

FIG.13

| COUNTRY NAME | STAGE OF REVISION OF EMISSIONS CONTROL (PREDICTION) |
|---|---|
| A | 1.0 |
| B | 2.7 |
| C | 3.2 |
| D | 2.8 |

FIG.14

| COUNTRY NAME | NEGOTIATION TIMING | RELIABILITY |
|---|---|---|
| A | PROPER | 85 |
| B | IMPROPER | 36 |
| C | IMPROPER | 71 |
| D | PROPER | 43 |

PREDICTION SYSTEM AND PREDICTION METHOD

This nonprovisional application is based on Japanese Patent Application No. 2021-039135 filed with the Japan Patent Office on Mar. 11, 2021, the entire contents of which are hereby incorporated by reference.

BACKGROUND

Field

The present disclosure relates to a prediction system and a prediction method.

Description of the Background Art

WO2018/230616 discloses a legal information processing system that predicts a trend in the revision of legislation, regulations, or standards (legislation etc.). This legal information processing system sets a key person who is involved in legislation etc., enters into an inference engine, public information in the publication of which the key person is involved, and predicts a trend in the revision of legislation etc.

SUMMARY

For manufacturers and the like, revision of legislation etc. relating to "manufacturing" is an important matter of interest. Revision of the legislation etc. requires the "manufacturers", for example, to do "manufacturing" in conformity with contents of revision. If the manufacturers are able to predict revision of the legislation etc., they can prepare for revision and/or perform negotiation activities relating to revision.

Information for predicting revision of the legislation etc. includes various types of information in addition to the information in the publication of which the key person is involved. For example, information on an economic scale and/or a speed of revision in a target country to which the legislation etc. is applied may also relate to revision of the legislation etc. Such information, however, is not information directly involved with a process of revision of the legislation etc. Therefore, entry of the information simply into the inference system in the legal information processing system disclosed in WO2018/230616 does not produce an accurate prediction result.

The present disclosure was made to solve the problems above, and an object of the present disclosure is to accurately predict revision of legislation etc.

(1) A prediction system according to one aspect of the present disclosure includes a first device that collects relevant information relating to revision of legislation, regulations, or standards (legislation etc.), a second device that performs predetermined conversion processing for converting the relevant information into an index relating to a degree of influence on the revision, and a third device that predicts based on the index, a stage of the revision or properness of negotiation timing relating to the revision.

According to such a configuration, the relevant information collected by the first device is converted by the second device into the index relating to the degree of influence on revision of the legislation etc. By using the resultant index, the third device predicts the stage of revision of the legislation etc. or properness of negotiation timing relating to revision of the legislation etc. Since the index relating to the degree of influence on revision of the legislation etc. is used for prediction of the stage of revision of the legislation etc. or properness of negotiation timing relating to revision of the legislation etc., accuracy in prediction can be higher than in prediction of the stage of revision of the legislation etc. or properness of negotiation timing relating to revision of the legislation etc. based on relevant information not directly involved with revision of the legislation etc.

(2) In one embodiment, the third device includes a first trained model trained through machine learning. The first trained model is trained through training processing using a first training data set to provide the stage of the revision of the legislation etc. or the properness of negotiation timing relating to revision of the legislation etc. in response to an input. The first training data set includes a plurality of pieces of training data obtained by labeling the index with the stage of the revision or the properness.

According to the configuration, the first trained model included in the third device is trained with the first training data set including a plurality of pieces of training data obtained by labeling the index relating to the degree of influence on revision of the legislation etc. with the stage of revision of the legislation etc. or properness of negotiation timing relating to revision of the legislation etc. As the index relating to the degree of influence on revision of the legislation etc. is used as training data, accuracy in prediction with the first trained model can be higher than in an example in which relevant information not directly involved with revision of the legislation etc. is used as training data.

(3) In one embodiment, prescribed information determined as motiving the revision of the legislation etc. is included.

For example, when the legislation etc. is directed to emissions control, the prescribed information determined as motiving revision of the legislation etc. includes information representing a result of observation of atmospheric pollution, information on media reports relating to atmospheric pollution, and/or information on research reports about atmospheric pollution. By converting the prescribed information into the index relating to the degree of influence on revision of the legislation etc. and providing the index to the third device, the stage of revision of the legislation etc. or properness of negotiation timing relating to revision of the legislation etc. can be predicted more accurately than in prediction of the stage of revision of the legislation etc. or properness of negotiation timing relating to revision of the legislation etc. by entry of prescribed information not directly involved with revision of the legislation etc. into the third device.

(4) In one embodiment, the prescribed information includes first information representing a result of observation of atmospheric pollution.

(5) In one embodiment, the second device converts to the index, by using a predetermined first function, an average value for a first prescribed period of values shown in the first information.

(6) In one embodiment, the second device sets as the index, a difference between the average value for the first prescribed period of the values shown in the first information and an average value for the first prescribed period of values shown in the first information in a previous year.

(7) In one embodiment, the second device calculates every second prescribed period, an excess over a reference value of a value shown in the first information, and sets an integrated value of excesses for a third prescribed period as the index, the third prescribed period being longer than the second prescribed period.

(8) In one embodiment, the second device sets as the index, the number of second prescribed periods during which the value shown in the first information exceeds the reference value.

According to the configuration in (4) to (8), the first information is converted to each index relating to the degree of influence on revision of the legislation etc. By converting the first information into the index and providing the index to the third device, the stage of revision of the legislation etc. or properness of negotiation timing relating to revision of the legislation etc. can be predicted more accurately than in prediction of the stage of revision of the legislation etc. or properness of negotiation timing relating to revision of the legislation etc. by entry of the first information not directly involved with revision of the legislation etc. into the third device.

(9) In one embodiment, the prescribed information includes second information which is information on media reports or research reports about atmospheric pollution.

(10) In one embodiment, the second device includes a second trained model trained through machine learning. The second trained model is trained through training processing using a second training data set to provide information representing a degree of influence on the revision of the legislation etc. in response to an input. The second training data set includes a plurality of pieces of training data obtained by labeling information on a predetermined item with information representing the degree of influence. The second device performs prescribed processing to extract the information on the predetermined item from the second information, sets the information on the predetermined item as an input to the second trained model, converts the information representing the degree of influence provided from the second trained model into a point by using a predetermined second function, and sets an average value of points for a fourth prescribed period as the index.

According to the configuration in (9) and (10), the second information is converted to each index relating to the degree of influence on revision of the legislation etc. By converting the second information into the index and providing the index to the third device, the stage of revision of the legislation etc. or properness of negotiation timing relating to revision of the legislation etc. can be predicted more accurately than in prediction of the stage of revision of the legislation etc. or properness of negotiation timing relating to revision of the legislation etc. by entry of the second information not directly involved with revision of the legislation etc. into the third device.

(11) In one embodiment, the relevant information includes third information representing an economic index of a target country to which the legislation etc. is applied.

For example, when the legislation etc. is directed to emissions control, the third information includes information on at least one of the GDP, an economic growth rate, a level of emissions control of a surrounding country, a scale of automobile markets, the number of cars per one person, and political transparency. In connection with emissions control, a speed of a revision process may be different depending on an economic scale or a size of the automobile markets in one country. By using economic index data, the stage of revision of the legislation etc. or properness of negotiation timing relating to revision of the legislation etc. can accurately be predicted.

(12) In one embodiment, the relevant information includes fourth information representing a date of revision of current legislation etc. The second device calculates a period elapsed since revision of the current legislation etc. based on the fourth information, and sets the elapsed period as the index.

A period elapsed since revision of the current legislation etc. is one of important factors in prediction of the stage of revision of the legislation etc. or properness of negotiation timing relating to revision of the legislation etc. By setting the period elapsed since revision of the current legislation etc. as the index and providing the index to the third device, the stage of revision of the legislation etc. or properness of negotiation timing relating to revision of the legislation etc. can accurately be predicted.

(13) In one embodiment, the relevant information includes fifth information representing a control level under the legislation etc. A target country is a country to which the legislation etc. is applied. The second device calculates, by using the fifth information, a difference between a level of the legislation etc. and a level of legislation etc. in a country set as a model case by the target country and sets the difference as the index.

A difference in level under the legislation etc. from a country set as the model case is one of important factors in prediction of the stage of revision of the legislation etc. or properness of negotiation timing relating to revision of the legislation etc. By setting the difference in level as the index and providing the index to the third device, the stage of revision of the legislation etc. or properness of negotiation timing relating to revision of the legislation etc. can accurately be predicted.

(14) A prediction method according to another aspect of the present disclosure includes collecting relevant information relating to revision of legislation etc., performing predetermined conversion processing for converting the relevant information into an index relating to a degree of influence on the revision of the legislation etc., and predicting based on the index, a stage of the revision of the legislation etc. or properness of negotiation timing relating to the revision of the legislation etc.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 is a diagram for illustrating details of an information processor.

FIG. 7 is a diagram for illustrating a procedure of processing by a first processor.

FIG. 8 is a diagram for illustrating an exemplary importance rank.

FIG. 9 is a diagram for illustrating conversion of an importance rank into a point.

FIG. 10 is a diagram for illustrating a jump-up system.

FIG. 11 is a diagram (No. 1) for illustrating each phase representing a stage of revision of emissions control.

FIG. 13 is a diagram for illustrating a result of prediction of the stage of revision of emissions control.

FIG. 14 is a diagram for illustrating a result of prediction of properness of negotiation timing.

DESCRIPTION OF THE PREFERRED EMBODIMENTS

Figure 1:
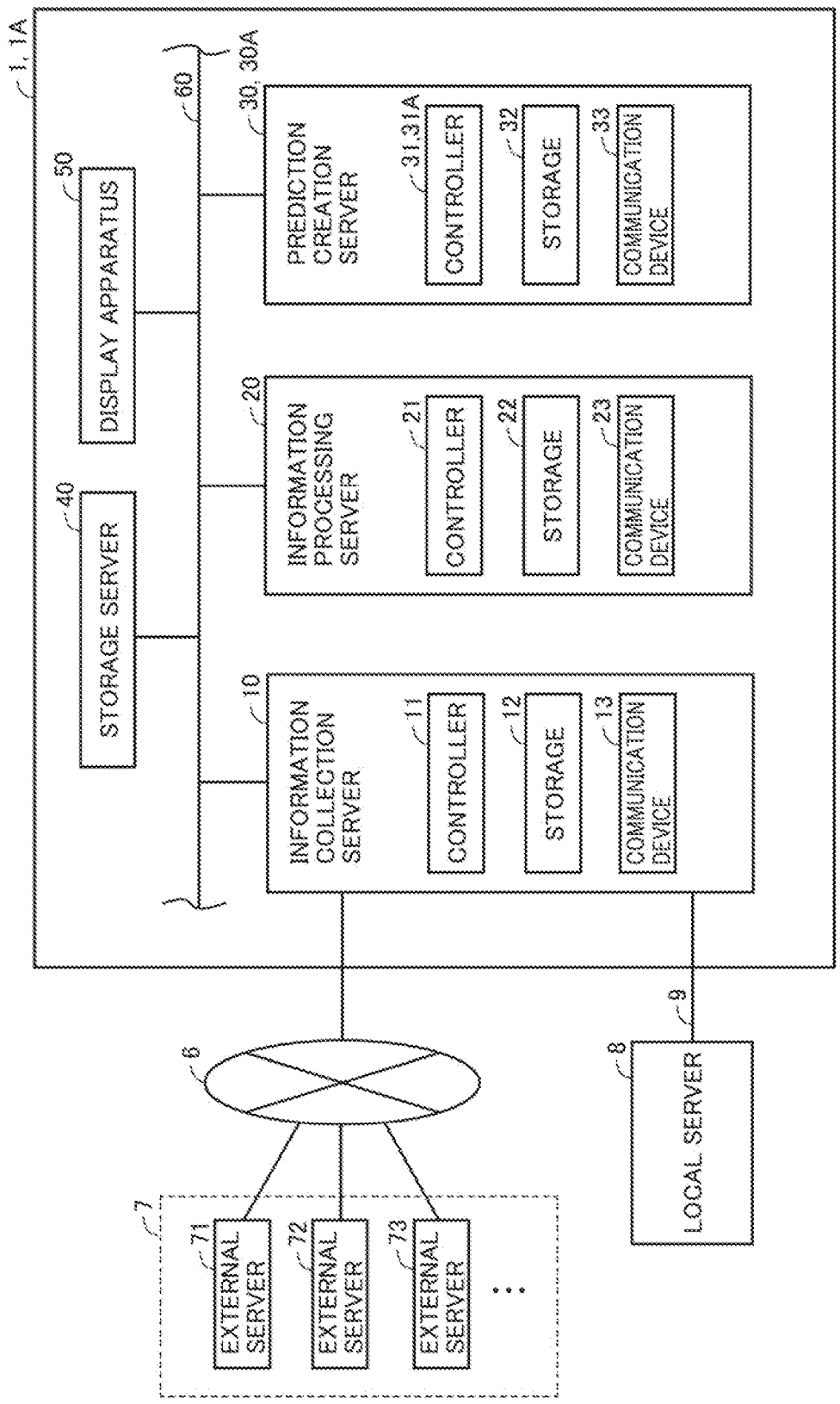
FIG. 1 is a diagram showing a schematic configuration of a prediction system according to a first embodiment.

An embodiment of the present disclosure will be described in detail below with reference to the drawings. The same or corresponding elements in the drawings have the same reference characters allotted and description thereof will not be repeated.

First Embodiment

Overall Configuration of Prediction System

FIG. 1 is a diagram showing a schematic configuration of a prediction system 1 according to the present embodiment. Prediction system 1 according to the present embodiment is a system that predicts a stage of revision of legislation etc. Prediction system 1 predicts the stage of revision of the legislation etc. every prescribed cycle. The prescribed cycle is a period that can be set as appropriate, such as one month or several months. For specific description, an example in which prediction system 1 predicts a stage of revision of vehicle emissions control will be described in the present embodiment. What is predicted by prediction system 1 is not limited to the stage of revision of vehicle emissions control but prediction system 1 can predict a stage of revision of various types of legislation etc.

Referring to FIG. 1, prediction system 1 includes an information collection server 10, an information processing server 20, a prediction creation server 30, a storage server 40, and a display apparatus 50. Information collection server 10, information processing server 20, prediction creation server 30, storage server 40, and display apparatus 50 are connected to a communication bus 60.

Information collection server 10 obtains relevant information relating to legislation etc. (vehicle emissions control) from an external server group 7 and a local server 8. Details of the relevant information will be described later. Information collection server 10 provides the obtained relevant information to information processing server 20 through communication bus 60. When information processing server 20 receives the relevant information from information collection server 10, information processing server 20 performs conversion processing on each of pieces of information included in the relevant information in accordance with each piece of information to convert each piece of information into an index relating to a degree of influence on revision of emissions control. Contents of the conversion processing are determined in accordance with a type of each piece of information. Details of the conversion processing will be described later. Information processing server 20 provides each resultant index to prediction creation server 30. When prediction creation server 30 receives each resultant index from information processing server 20, prediction creation server 30 predicts a stage of revision of emissions control based on each index. Prediction creation server 30 has display apparatus 50 show the predicted stage of revision of emissions control.

Display apparatus 50 includes a display. Display apparatus 50 shows on the display, various images in accordance with a control signal from prediction creation server 30. The display is, for example, a liquid crystal display, an organic electroluminescence (EL) display, or another display device.

Storage server 40 includes a storage medium such as a hard disk or a flash memory. Various types of information (relevant information) obtained by information collection server 10, various indices resulting from conversion by information processing server 20, and information representing a stage of revision of emissions control predicted by prediction creation server 30 are stored in storage server 40. Each of information collection server 10, information processing server 20, and prediction creation server 30 can have desired information stored in storage server 40 or can read desired information from storage server 40.

Figure 2:
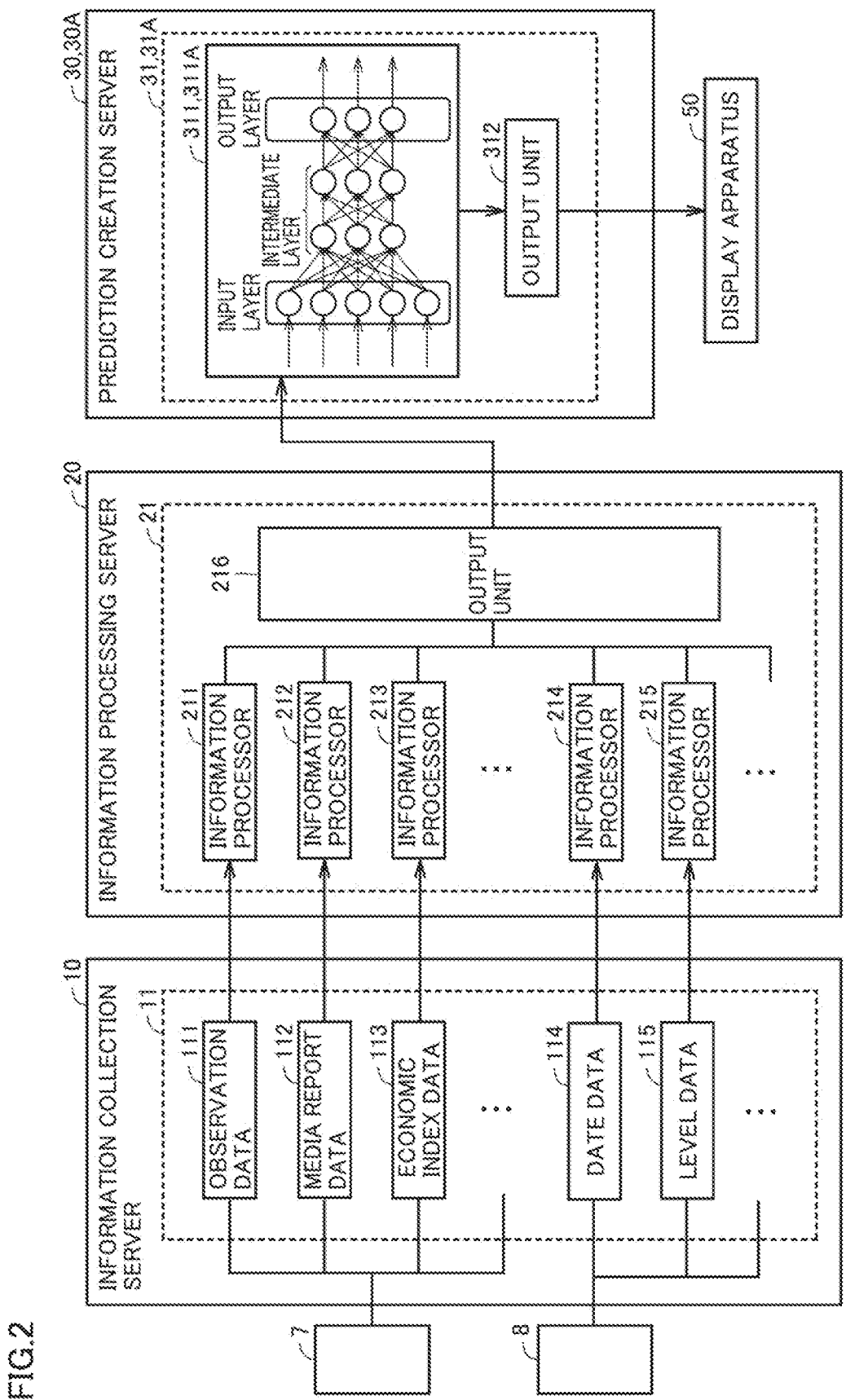
FIG. 2 is a diagram for illustrating a function of each component of the prediction system.

Details of a configuration of each of information collection server 10, information processing server 20, and prediction creation server 30 will sequentially be described with reference to FIGS. 1 and 2. FIG. 2 is a diagram for illustrating a function of each component of prediction system 1.

<Information Collection Server>

Referring initially to FIG. 1, information collection server 10 includes a controller 11, a storage 12, and a communication device 13.

Storage 12 includes, for example, a read only memory (ROM) and a random access memory (RAM), and a program executed by controller 11 is stored in storage 12. Information (for example, a map, a mathematical expression, and various parameters) to be used in execution of a program may further be stored in storage 12.

Controller 11 is implemented, for example, by an integrated circuit including a central processing unit (CPU). Controller 11 executes a program stored in storage 12. Controller 11 obtains desired information from external server group 7 and local server 8, for example, through communication device 13.

Communication device 13 is configured to bidirectionally communicate with external server group 7 over the Internet 6. External server group 7 includes external servers 71, 72, 73, . . . Each of external servers 71, 72, 73, . . . is managed by a manager different from or the same as a manager who manages prediction system 1. Various types of information including the relevant information relating to legislation etc. (vehicle emissions control) are stored in each of external servers 71, 72, 73, . . .

Communication device 13 is configured to bidirectionally communicate with local server 8 through a communication line 9. Local server 8 is managed by the manager who manages prediction system 1, and it is, for example, an in-house server. Various types of information such as the relevant information relating to legislation etc. (vehicle emissions control) are stored in local server 8. The relevant information stored in local server 8 includes various types of information such as a date of revision of emissions control in home country and other countries, a level of emissions control in home country and other countries, records of meetings relating to emissions control, and records in a company such as interviews relating to emissions control.

Communication device 13 and local server 8 may communicate with each other, for example, over a local area network (LAN) or a wide area network (WAN).

Communication device 13 is configured to bidirectionally communicate with information processing server 20 through communication bus 60.

Referring to FIG. 2, controller 11 of information collection server 10 includes an observation data collector 111, a media report data collector 112, an economic index data collector 113, a date data collector 114, and a level data collector 115. Controller 11 functions as observation data collector 111, media report data collector 112, economic index data collector 113, date data collector 114, and level data collector 115 by executing a program stored in storage 12. Observation data collector 111, media report data collector 112, economic index data collector 113, date data collector 114, and level data collector 115 may be implemented, for example, by dedicated hardware (electronic circuitry).

In the present embodiment, relevant information includes (1) information representing a result of observation of atmospheric pollution, (2) information on media reports or research reports about atmospheric pollution, (3) information representing an economic index of a target country to which emissions control are applied (that is, a country that institutes legislation etc.), (4) information representing a date of previous revision of emissions control in the target country to which emissions control are applied, and (5) information representing a current control level in the target country to which emissions control are applied. The relevant information may include another type of information relating to emissions control other than the information (1) to (5). In this case, controller 11 is provided with a function to obtain another type of information.

Observation data collector 111 collects information representing a result of observation of atmospheric pollution from external server group 7 over the Internet 6. Observation data collector 111 provides the collected information representing the result of observation of atmospheric pollution to information processing server 20. The information representing the result of observation of atmospheric pollution according to the present embodiment is observation data of a concentration of PM 2.5 (which is also referred to as a "PM concentration" below). The information representing the result of observation of atmospheric pollution includes, for example, real-time observation data from atmospheric observatories all over the world. Real-time observation data from atmospheric observatories all over the world is collectively stored, for example, in one external server (for example, external server 71) included in external server group 7. The information representing the result of observation of atmospheric pollution is also referred to as "observation data" below. Observation data collector 111 collects observation data, for example, for each day. Observation data corresponds to exemplary "first information" according to the present disclosure.

Media report data collector 112 collects information on media reports or research reports about atmospheric pollution from external server group 7 over the Internet 6. The information on media reports or research reports about atmospheric pollution is collected for each country that predicts a stage of revision of emissions control. Media report data collector 112 provides the collected media reports or research reports about atmospheric pollution to information processing server 20. Media report data collector 112 accurately obtains from external server group 7, the information on media reports or research reports about atmospheric pollution by performing filtering processing. The information on media reports or research reports about atmospheric pollution is also collectively referred to as "media report data" below. Media report data corresponds to exemplary "second information" according to the present disclosure.

Figure 3:
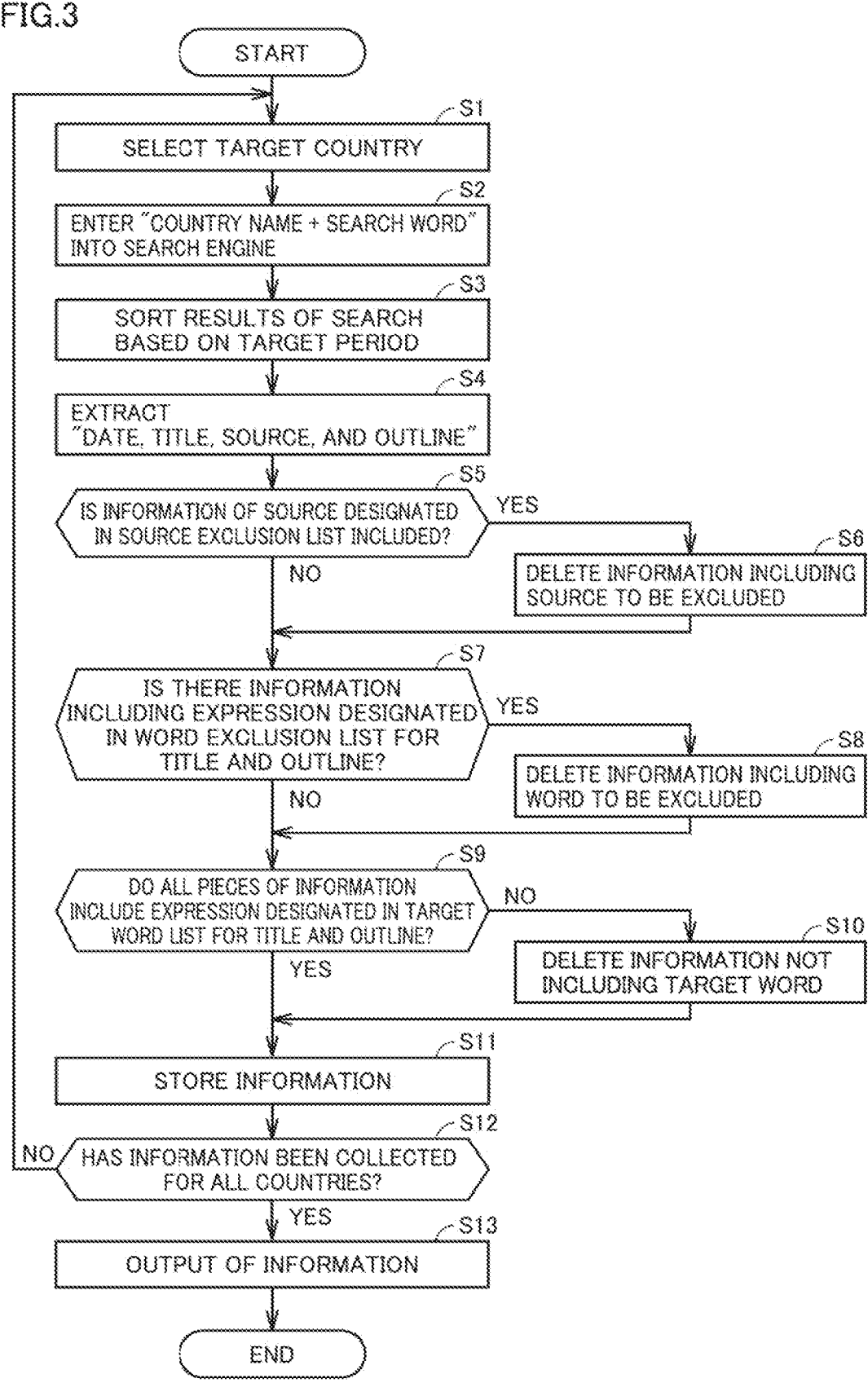
FIG. 3 is a flowchart showing a procedure of processing for obtaining information on media reports or research reports (media report data) about atmospheric pollution.

FIG. 3 is a flowchart showing a procedure of processing for obtaining information on media reports or research reports (media report data) about atmospheric pollution. Processing in the flowchart shown in FIG. 3 is repeatedly performed by controller 11 (media report data collector 112) every prescribed cycle (for example, one month). Though an example in which each step (the step being abbreviated as "S" below) in the flowchart shown in FIG. 3 is performed by software processing by controller 11 will be described, a part or the entirety may be performed by hardware (electronic circuitry) made in controller 11.

In S1, controller 11 selects one of countries (a plurality of target countries) a stage of revision of emissions control of which is to be predicted. In other words, controller 11 selects one target country from among the plurality of target countries. Information on the plurality of target countries is set in advance and stored, for example, in storage 12 of information collection server 10. Controller 11 reads information on the plurality of target countries from storage 12 and recognizes the plurality of target countries.

In S2, controller 11 searches the Internet 6 for information by entering a keyword in a search engine. For example, controller 11 searches for information by entering a "country name" and a "defined search word." The "defined search word" is a word determined in advance in accordance with legislation etc. The defined search word includes, for example, "air pollution" and "atmospheric pollution" in the field of emissions control. The defined search word is stored in advance, for example, in storage 12 of information collection server 10. The defined search word may be determined for each target country in consideration of an official language of the target country. Controller 11 reads from storage 12, the defined search word in accordance with the target country selected in S1 and enters the word in the search engine.

In S3, controller 11 sorts information included in results of search in S2 (that is, hit information) in a reverse chronological order or in a chronological order. Then, controller 11 adopts information included within a target period as a result of search. The target period is set, for example, to a period from previous search until the current time point. In other words, controller 11 picks up information added to external server group 7 after previous search.

In S4, controller 11 extracts a date of upload, a title, a source, and an outline from each piece of information included in the result of search. Specifically, controller 11 performs processing for text information syntax analysis on each piece of information included in the result of search to extract the title and the outline from information resulting from syntax analysis. A known approach can be applied as an approach to text information syntax analysis. A known approach can be applied as an approach to extraction of the title and the outline from information resulting from syntax analysis.

In S5, controller 11 determines whether or not information included in the result of search includes information given from a source included in a "source exclusion list." The "source exclusion list" is a list for excluding information low in reliability. The source exclusion list is created in advance and stored, for example, in storage 12 of information collection server 10. Controller 11 performs processing in S5 by checking information on the source extracted in S4 against the source exclusion list. When the information included in the result of search includes information given from a source included in the source exclusion list (YES in S5), controller 11 has the process proceed to S6. When the information included in the result of search does not include information given from a source included in the source exclusion list (NO in S5), controller 11 has the process proceed to S7.

In S6, controller 11 deletes information given from the source (source to be excluded) included in the source exclusion list from the result of search. Then, controller 11 has the process proceed to S7.

In S7, controller 11 determines whether or not there is information including a "word to be excluded" in the title and the outline among pieces of information included in the result of search. The word to be excluded refers to an expression included in an "exclusion word list." The "exclusion word list" is a list for improving accuracy in search for information by excluding information including an expression that can be a bug from the result of search. By way of example, in search for information on media reports or research reports (media report data) about atmospheric pollution, an exclusion word list about atmospheric pollution created in advance is referred to. The exclusion word list about atmospheric pollution includes an expression such as water pollution and ground pollution. By excluding such expressions from a search target, possibility that only information on atmospheric pollution remains in results of search can be enhanced and accuracy in search for information can be enhanced. The exclusion word list is created in advance and stored, for example, in storage 12 of information collection server 10. Controller 11 performs processing in S7 by checking the title and the outline in information included in the result of search against an exclusion list. When there is information including a word to be excluded in the title and the outline among pieces of information included in the result of search (YES in S7), controller 11 has the process proceed to S8. When there is no information including a word to be excluded in the title and the outline among pieces of information included in the result of search (NO in S7), controller 11 has the process proceed to S9.

In S8, controller 11 deletes the information including the word to be excluded in the title and the outline from the result of search. Then, controller 11 has the process proceed to S9.

In S9, controller 11 determines whether or not all pieces of information included in the result of search include an expression (a target word) designated in a "target word list" in the title and the outline thereof. The "target word list" is a list for improving accuracy in search for information by excluding information not including a target word from the result of search. The target word list is created in advance and stored, for example, in storage 12 of information collection server 10. Controller 11 performs processing in S9, for example, by searching for a target word in the title and the outline in information included in the result of search. When the information included in the result of search includes information not including the target word (NO in S9), controller 11 has the process proceed to S10. When all pieces of information included in the result of search include a target word (YES in S9), controller 11 has the process proceed to S11.

In S10, controller 11 deletes information not including the target word in the title and the outline from the result of search. Then, controller 11 has the process proceed to S11.

In S11, controller 11 has the result of search (information included in the result of search) stored in storage 12. Controller 11 may have the result of search stored in storage server 40. Controller 11 may provide output of the result of search in an Excel® format.

In S12, controller 11 determines whether or not it has collected information on all of the plurality of target countries. When controller 11 has not collected information on all of the plurality of target countries (NO in S12), controller 11 has the process return to S1. In S1, controller 11 selects a country information on which has not yet been collected and performs processing in S1 or later to collect information. When controller 11 has collected information on all of the plurality of target countries (YES in S12), controller 11 has the process proceed to S13.

In S13, controller 11 provides the result of search (information included in the result of search) of all of the plurality of target countries through communication device 13 to information processing server 20 and quits the process.

Referring again to FIG. 2, economic index data collector 113 collects information representing an economic index from external server group 7 over the Internet 6. The information representing the economic index includes information, for example, on at least one of a gross domestic product (GDP), an economic growth rate, a level of emissions control in a surrounding country, a scale of automobile markets, the number of cars per one person, and political transparency (for example, a corruption perceptions index). A speed of a process of revision of emissions control may be different depending on the economic scale and the size of the automobile markets in a country. Therefore, in the present embodiment, information representing an economic index is collected and used for prediction of a stage of revision of emissions control. Economic index data collector 113 collects information representing the economic index for each of countries (a plurality of target countries) a stage of revision of emissions control of which is to be predicted. Then, economic index data collector 113 provides the collected information representing the economic index to information processing server 20. Information representing the economic index is also referred to as "economic index data" below. The economic index data corresponds to exemplary "third information" according to the present disclosure.

Date data collector 114 collects information representing a date of previous revision of emissions control from local server 8. Date data collector 114 collects the information representing the date of revision of emissions control for each of a plurality of target countries. Then, date data collector 114 provides the collected information representing the date of revision of emissions control to information processing server 20. The information representing the date of revision of emissions control is also referred to as "date data" below. The date data is stored in local server 8, for example, in response to an instruction from a monitoring person who monitors revision of emissions control to store revision information including the date of revision in local server 8. The date data corresponds to exemplary "fourth information" according to the present disclosure.

Level data collector 115 collects information representing a current level of emissions control from local server 8. Level data collector 115 obtains information representing the current level of emissions control for each of the plurality of target countries. The level of emissions control is set, for example, with European emissions control (for example, Euro 1 to 6) being defined as the reference. In other words, the level of emissions control results from conversion of emissions control of one country into European emissions control. Level data collector 115 provides the collected information representing the current level of emissions control to information processing server 20. The information representing the current level of emissions control is also referred to as "control level data" below. For example, a monitoring person who monitors revision of emissions control has revision information including the level of emissions control stored in local server 8 as the control level data. The control level data corresponds to exemplary "fifth information" according to the present disclosure.

<Information Processing Server>

Referring to FIG. 1, information processing server 20 includes a controller 21, a storage 22, and a communication device 23.

Storage 22 includes, for example, a ROM and a RAM, and a program executed by controller 21 is stored in storage 22. Information (for example, a map, a mathematical expression, and various parameters) to be used in execution of a program may further be stored in storage 22.

Communication device 23 is configured to bidirectionally communicate with information collection server 10 and prediction creation server 30 through communication bus 60.

Controller 21 is implemented, for example, by an integrated circuit including a CPU. Controller 21 executes a program stored in storage 22. Controller 21 obtains relevant information from information collection server 10, for example, through communication device 23. Controller 21 performs conversion processing on each of pieces of information included in the obtained relevant information in accordance with each piece of information to convert each piece of information into an index relating to a degree of influence of revision of emissions control.

Referring to FIG. 2, controller 21 of information processing server 20 includes information processors 211 to 215 and an output unit 216. Controller 21 functions as information processors 211 to 215 and output unit 216 by executing a program stored in storage 22. Information processors 211 to 215 and output unit 216 may be implemented, for example, by dedicated hardware (electronic circuitry).

Information processor 211 obtains information (observation data) representing a result of observation of atmospheric pollution from observation data collector 111. This observation data represents a result of observation of a PM concentration. Information processor 211 performs conversion processing on observation data to convert the observation data into an index relating to the degree of influence on revision of emissions control. In the present embodiment, information processor 211 converts observation data into four indices.

A first index is an index obtained by converting an annual average value of the PM concentration into a point. Information processor 211 reads, for example, results of observation of the PM concentration in the past from storage server 40. Then, information processor 211 calculates an annual average value Ave of the PM concentration based on the results of observation of the PM concentration in the past and a presently collected result of observation of the PM concentration. Information processor 211 converts calculated annual average value Ave into a point P.

Figure 4:
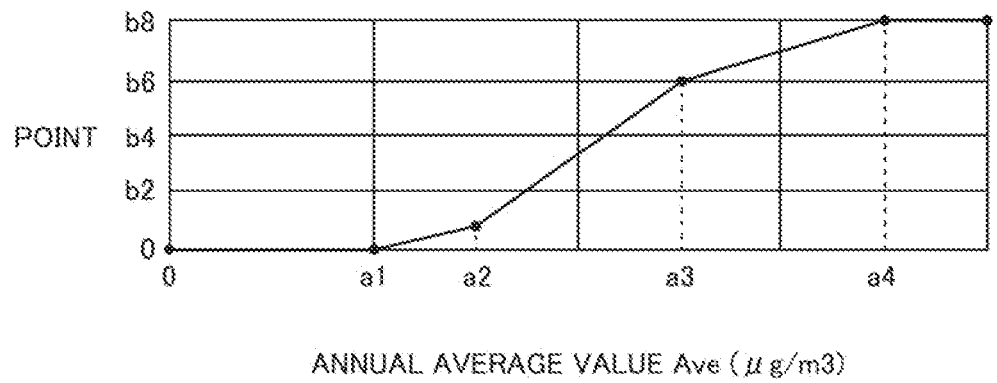
FIG. 4 is diagram for illustrating conversion of an annual average value Ave into a point P.

FIG. 4 is diagram for illustrating conversion of annual average value Ave into point P. A first function shown in FIG. 4 is used for conversion of annual average value Ave into point P. For example, a piecewise linear function is adopted as the first function. The abscissa in FIG. 4 represents annual average value Ave [µg/m³] and the ordinate represents point P. In the present embodiment, annual average value Ave is converted to points P from 0 to b8 (0< . . . <b8). When annual average value Ave is smaller than a1, information processor 211 sets point P to 0 in accordance with the function in a first section. When annual average value Ave is equal to or larger than a1 and smaller than a2 (>a1), information processor 211 sets point P in accordance with the function in a second section. When annual average value Ave is equal to or larger than a2 and smaller than a3 (>a2), information processor 211 sets point P in accordance with the function in a third section. When annual average value Ave is equal to or larger than a3 and smaller than a4 (>a3), information processor 211 sets point P in accordance with the function in a fourth section. When annual average value Ave is equal to or larger than a4, information processor 211 sets point P to b8 in accordance with the function in a fifth section. With set point P being defined as the index, information processor 211 provides the index to output unit 216. Point P corresponds to an exemplary "index" according to the present disclosure.

The first function may be derived, for example, by referring to the guidelines established by the World Health Organization (WHO) based on epidemiologic researches (for example, researches on correlation between a contaminant concentration and health damages). Specifically, the guidelines established by the WHO define a standard (air quality guidelines: AQG) to be satisfied for preventing health damages and interim targets 1 to 3 before satisfying the standard. For example, a value indicated in interim target 1 can be adopted as a4, a value indicated in interim target 2 can be adopted as a3, a value indicated in interim target 3 can be adopted as a2, and a value indicated in the standard (AQG) to be satisfied for preventing heath damages can be adopted as a1. Interim targets 1 to 3 are defined as stepwise targets for achieving the standard (AQG) to be satisfied for preventing health damages. The first function can be set, for example, as below.

When annual average value Ave is smaller than a1, the standard (AQG) to be satisfied for preventing health damages has been achieved and influence on health by atmospheric pollution (PM 2.5) is considered as not being found. Therefore, needs for revision of vehicle emissions control are expected to be low. Therefore, the function in the first section with point P being set to 0 is set.

When annual average value Ave is equal to or larger than a4, interim target 1 has not been achieved and influence on health by atmospheric pollution (PM 2.5) is considered as clearly being found. Therefore, early improvement in air quality is desired and hence the function in the fifth section with point P being set to b8 is set.

When annual average value Ave is equal to or larger than a1 and smaller than a2, the standard (AQG) to be satisfied for preventing health damages is almost achieved. In this situation, for example, vehicle emissions control strict to some extent have already been introduced, and whether or not to introduce stricter emissions control may be discussed. In this discussion, restriction on other emission sources (for example, marine vessels or power plants) other than automobiles may also be studied, and revision of vehicle emissions control is not necessarily highly demanded. Therefore, the function in the second section is set, with point P at the time of annual average value Ave being a2 being set to a value slightly larger than 0.

When annual average value Ave is equal to or larger than a3 and smaller than a4, the PM concentration is high and atmospheric pollution is relatively serious. Therefore, it is expected that revision of vehicle emissions control is highly demanded. Therefore, the function in the fourth section is set, with a gentle inclination being set in a range of high points.

When annual average value Ave is equal to or larger than a2 and smaller than a3, the function in the third section is set based on the endpoint of the function in the second section and the starting point of the function in the fourth section.

The second index is an index indicating a difference ΔAve between annual average value Ave and an annual average value Ave1 in a previous year. For example, when the current time point is December 2020, annual average value Ave is an average value of the PM concentration from January to December 2020, and annual average value Ave1 is an average value of the PM concentration from January to December 2019. Difference ΔAve is calculated by subtracting Ave1 from Ave (ΔAve=Ave−Ave1). Information processor 211 reads, for example, observation data of the PM concentration in two years in the past from storage server 40. Information processor 211 calculates annual average value Ave and annual average value Ave1 in the previous year. Then, information processor 211 calculates difference ΔAve. With calculated difference ΔAve being defined as the index, information processor 211 provides the index to output unit 216. Difference ΔAve corresponds to an exemplary "index" according to the present disclosure.

The third index is an index representing an integrated value over a month, of the PM concentration exceeding a reference. Information processor 211 reads, for example, observation data of the PM concentration over most recent one month from storage server 40. Then, information processor 211 compares observation data with a reference value ath for each day, integrates excesses over reference value ath, and calculates an integrated value S. With integrated value S being defined as the index, information processor 211 provides the index to output unit 216. Integrated value S corresponds to an exemplary "index" according to the present disclosure.

Figure 5:
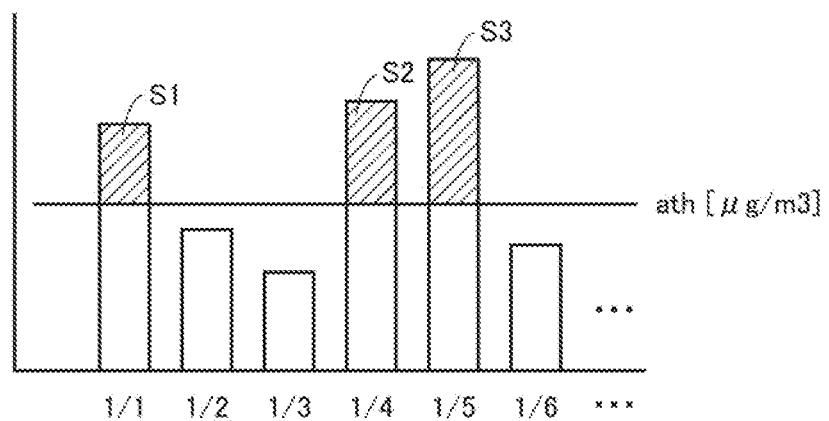
FIG. 5 is a diagram for illustrating calculation of an integrated value S.

FIG. 5 is a diagram for illustrating calculation of integrated value S. The abscissa in FIG. 5 represents a date and the ordinate represents a PM concentration. In the example shown in FIG. 5, the PM concentration exceeds reference value ath on 1/1, 1/4, and 1/5. With excesses over reference value ath of the PM concentration on 1/1, 1/4, and 1/5 being expressed as S1, S2, and S3, respectively, information processor 211 integrates (adds) S1 to S3 to calculate integrated value S. Reference value ath may be set, for example, by referring to the guidelines established by the WHO described above. For example, a4 in FIG. 4 may be set as reference value ath.

The fourth index is an index representing the number of days in a month on which reference value ath was exceeded. For example, in calculation of integrated value S, by counting the number of days on which the PM concentration exceeded reference value ath, information processor 211 calculates the number of excess days D which represents the number of days on which reference value ath was exceeded. With the number of excess days D being defined as the index, information processor 211 provides the index to output unit 216. The number of excess days D corresponds to an exemplary "index" according to the present disclosure.

Information processor 212 obtains information on media reports or research reports (media report data) about atmospheric pollution from media report data collector 112. Information processor 212 performs conversion processing on the media report data to convert the media report data into an index relating to the degree of influence on revision of emissions control.

FIG. 6 is a diagram for illustrating details of information processor 212. Referring to FIG. 6, information processor 212 includes a first processor 2121, a second processor 2122, and a third processor 2123.

First processor 2121 checks a source of media report data against a classification list and performs pre-processing for excluding data slight in influence on revision of emissions control. The classification list is created for each country and stored in storage 22 or storage server 40. The classification list is regularly maintained and a source is added thereto and deleted therefrom. The classification list includes a name of a source (for example, A newspaper and B society) and a classification category (for example, a mass medium or an academic report) brought in correspondence with the name of the source.

FIG. 7 is a diagram for illustrating a procedure of processing by first processor 2121. Processing in the flowchart shown in FIG. 7 is performed by first processor 2121 at the time of reception of media report data.

In S21, first processor 2121 reads the classification list from storage 22 or storage server 40 and checks the source of the media report data against the classification list. First processor 2121 may extract the source from the media report data as in the processing in S4 in FIG. 3. Alternatively, first processor 2121 may receive media report data to which information representing the extracted title, source, and outline has been added from information collection server 10.

In S22, first processor 2121 classifies media report data for each classification category. Specifically, first processor 2121 classifies the media report data, for example, into such categories as a mass medium and an academic report.

In S23, first processor 2121 determines whether or not it has successfully classified the media report data. For example, media report data from a source not found in the classification list is unclassifiable. When first processor 2121 has not successfully classified the media report data (YES in S23), first processor 2121 has the process proceed to S24. When first processor 212 has successfully classified the media report data (NO in S23), first processor 2121 has the process proceed to S25.

In S24, first processor 2121 classifies the unclassified media report data into non-target. Then, first processor 2121 has the process proceed to S25.

In S25, first processor 2121 creates input data for input to second processor 2122. A format of input data has been determined. Input data includes classification information representing a title, a source, an outline, and a classification category. In the present embodiment, input data is not created for media report data classified into non-target. The classification information representing a title, a source, an outline, and a classification category corresponds to exemplary "information on a predetermined item" according to the present disclosure.

Referring again to FIG. 6, first processor 2121 provides the created input data to second processor 2122.

Second processor 2122 accepts the input data from first processor 2121 and weights the input data. Specifically, second processor 2122 reads from the input data, a title, a source, an outline, and classification information as a feature value. Second processor 2122 includes a trained model trained through machine learning and provides an importance rank of the input data in accordance with a calculation rule constructed by training with the title, the source, the outline, and the classification information being defined as the feature value. Machine learning refers to an approach to iterative learning based on given information (for example, a training data set) to autonomously establish rules or criteria.

FIG. 8 is a diagram for illustrating an exemplary importance rank. FIG. 8 shows fields for an importance rank, a point, and a standard. In the example shown in FIG. 8, importance ranks 1 to 7 are provided. The importance rank represents a degree of influence by input data on revision of emissions control, and as a value thereof is larger, importance is higher. In the standard, an outline of information to which the importance rank is provided is described. Importance rank 1 is given to information irrelevant to atmospheric pollution. Importance rank 2 is given to information that relates to atmospheric pollution but does not indicate urgency of revision of emissions control. Importance rank 3 is given to information that poses problems of atmospheric pollution. Importance rank 4 is given to information representing seriousness of atmospheric pollution. Importance rank 5 is given to information that may lead to revision of emissions control (for example, information suggesting some measures to be taken by the government against atmospheric pollution). Importance rank 6 is given to information that represents possibility of revision of emissions control including restriction on automobiles (information suggesting that automobiles are included in targets to which measures taken by the government against atmospheric pollution are directed). Importance rank 7 is given to information representing a specific proposal and/or a proposed schedule of revision of emissions control including restriction on automobiles. Description in connection with points will be given later.

Referring again to FIG. 6, the trained model included in second processor 2122 is trained to provide output of the importance rank from input data by what is called supervised learning in accordance with a neural network model.

The neural network is constituted of an input layer composed of a plurality of neurons, an intermediate layer (a hidden layer) composed of a plurality of neurons, and an output layer composed of a plurality of neurons. The intermediate layer may be composed of a single layer or at least two layers. For example, when a plurality of inputs (indices) are provided to the input layer, they are provided to the intermediate layer as being weighted. The input values are provided to the output layer as being further weighted in the intermediate layer and the output layer provides results.

Supervised learning refers to an approach to inference of a result from inputs by learning of features in a training data set by giving a set of data of inputs and results (labels) (training data set) to second processor 2122. In other words, the trained model included in second processor 2122 is generated by repeatedly performing training processing by using the training data set. The training data set includes, for example, a plurality of pieces of training data obtained by labeling input data (the title, the source, the outline, and the classification information) given as inputs with the importance rank as an output. The input data is labeled with the importance rank, for example, by a person skilled in the art. Upon receiving the input data, second processor 2122 (trained model) trained with the training data set as above provides the importance rank. Second processor 2122 provides the importance rank to third processor 2123.

Second processor 2122 may be trained, for example, every prescribed cycle. Since information in external server group 7 and local server 8 is updated every day, a training data set corresponding to newly added data may be prepared every prescribed cycle and second processor 2122 may be trained therewith. Accuracy of output from second processor 2122 can thus be enhanced.

Third processor 2123 performs post-processing for converting the importance rank received from second processor 2122 into a point. A second function is used for conversion of the importance rank into a point. The second function is a function for weighting the importance rank and calculating a point. In other words, in post-processing, the importance rank received from second processor 2122 is weighted with a weight coefficient and converted to a point.

FIG. 9 is a diagram for illustrating conversion of an importance rank into a point. The abscissa in FIG. 9 represents an importance rank and the ordinate represents a point. The point represented on the ordinate is the same as the point shown in FIG. 8. The second function shown in FIG. 9 may be derived, for example, from a model in which a point exponentially increases with increase in importance rank. For example, importance rank 1 is set to 0 point. Importance rank 2 is set to 0.1 point. Importance rank 3 is set to 0.5 point. Importance rank 4 is set to 1.5 point. Importance rank 5 is set to 3.5 point. Importance rank 6 is set to 6.0 point. Importance rank 7 is set to 9.0 point. The weight coefficient used for conversion of the importance rank into the point may be determined, for example, based on past data (data representing relation between the importance rank and records of revision of emissions control). Alternatively, the weight coefficient may be determined based on knowledge of a person skilled in the art with much experience in negotiation with government officials in connection with revision of emissions control. Alternatively, the weight coefficient may be determined based on both of the past data and knowledge of a person skilled in the art. The weight coefficient can also be understood as an interest level of the government about emissions control.

Third processor 2123 converts the importance rank into the point for each piece of media report data and calculates a monthly average of the points. Then, third processor 2123 provides information representing the monthly average of the points to output unit 216. The monthly average of the points corresponds to an exemplary "index" according to the present disclosure.

Referring again to FIG. 2, information processor 213 obtains information (economic index data) representing the economic index from economic index data collector 113. With the economic index data being defined as the index, information processor 213 provides the index to output unit 216. The economic index data corresponds to an exemplary "index" according to the present disclosure. The economic index data that is published only once a year such as political transparency (for example, a corruption perceptions index) is set based on a jump-up system in which a previously published value is used until next publication.

FIG. 10 is a diagram for illustrating the jump-up system. The abscissa in FIG. 10 represents a date and the ordinate represents a value of a corruption perceptions index. For example, it is assumed that the corruption perceptions index is published every January.

In the example shown in FIG. 10, the corruption perceptions index was published in January 2019 and a value thereof was c1. Then, a new corruption perceptions index was published in January 2020 and a value thereof was c2. Information processor 213 calculates the corruption perceptions index as c1 from January to December 2019. With publication of the new corruption perceptions index in January 2020, information processor 213 calculates the corruption perceptions index as c2 from January to December 2020.

Referring again to FIG. 2, information processor 214 obtains information (date data) representing a date of previous revision of emissions control from date data collector 114. Information processor 214 specifies the date of previous revision of emissions control based on the date data and counts the number of months elapsed since the date of revision until the current time point. With the number of elapsed months being defined as the index, information processor 214 provides the index to output unit 216. The number of elapsed months corresponds to an exemplary "index" according to the present disclosure.

Information processor 215 obtains information (control level data) representing a current level of emissions control from level data collector 115. Information processor 215 reads from storage server 40, information on emissions control in a target country (a country of application) to which the obtained control level data is applied. Information on emissions control includes at least information representing a level of emissions control in each country and information representing a country defined as a model case by each country. Information processor 215 calculates a level difference $\Delta Lv$ which is a difference between a control level of a target country (a control level represented by obtained control level data) and a control level in a country defined as a model case by the target country. With calculated level difference $\Delta Lv$ being defined as the index, information processor 215 provides the index to output unit 216. For example, a country in the lead in introduction of emissions control in a peripheral area thereof or an advanced country is set as the country defined as the model case. The information on emissions control is determined in advance and stored in storage server 40. For example, when emissions control is revised in one country, information on the emissions control is updated to reflect such revision.

Specifically, an example of reception of control level data of a country A is assumed and described. For example, it is assumed that the emissions control level in country A is Euro 4, a country defined as a model case by country A is a country B, and the emissions control level in country B is Euro 6. In this case, information processor 215 calculates as level difference $\Delta Lv$, "2" which is a difference of the emissions control level in country A from the emissions control level in country B ($\Delta Lv$: Euro 6–Euro 4). Level difference $\Delta Lv$ corresponds to an exemplary "index" according to the present disclosure.

Output unit 216 provides the indices (point P, difference $\Delta Ave$, integrated value S, the number of excess days D, a monthly average of points, economic index data, the number of elapsed months, and level difference $\Delta Lv$) received from information processors 211 to 215 to prediction creation server 30.

Prediction Creation Server

Referring to FIG. 1, prediction creation server 30 includes a controller 31, a storage 32, and a communication device 33.

Storage 32 includes, for example, a ROM and a RAM, and a program executed by controller 31 is stored in storage 32. Information (for example, a map, a mathematical expression, and various parameters) to be used in execution of a program may further be stored in storage 32.

Communication device 33 is configured to bidirectionally communicate with information processing server 20 through communication bus 60.

Controller 31 is implemented, for example, by an integrated circuit including a CPU. Controller 31 executes a program stored in storage 32. Controller 31 predicts a stage of revision of emissions control, for example, by receiving input of each index from information processing server 20 through communication device 33.

Referring to FIG. 2, controller 31 of prediction creation server 30 includes a prediction engine unit 311 and an output unit 312. Controller 31 functions as prediction engine unit 311 and output unit 312 by executing a program stored in storage 32.

Prediction engine unit 311 accepts as input data, each index from output unit 216 of information processing server 20. Prediction engine unit 311 predicts the stage of revision of emissions control in accordance with a calculation rule constructed by training, with each index being defined as a feature value. Prediction engine unit 311 is trained to predict the stage of revision of emissions control from input data by what is called supervised learning in accordance with a neural network model.

The neural network is constituted of an input layer composed of a plurality of neurons, an intermediate layer (a hidden layer) composed of a plurality of neurons, and an output layer composed of a plurality of neurons. The intermediate layer may be composed of a single layer or at least two layers. For example, when a plurality of inputs (indices) are provided to the input layer, they are provided to the intermediate layer as being weighted. The input values are provided to the output layer as being further weighted in the intermediate layer and the output layer provides results.

The training data set includes a plurality of pieces of training data obtained by labeling input data obtained by combining indices provided from output unit 216 of information processing server 20 in any pattern with the stage of revision of emissions control. The training data is created by labeling combination of indices with the stage of revision of emissions control at that time. The training data is created, for example, by a person skilled in the art. Since the index relating to the degree of influence on revision of emissions control is used as the training data in the present embodiment, improvement in accuracy in prediction by prediction engine unit 311 (trained model) is expected as compared with an example in which collected relevant information is employed as it is as training data. Upon receiving input data, prediction engine unit 311 (trained model) trained with the training data set as above provides the stage of revision of emissions control. Prediction engine unit 311 may be trained, for example, every prescribed cycle. Since information in external server group 7 and local server 8 is updated every day, a training data set corresponding to newly added data may be prepared every prescribed cycle and prediction engine unit 311 may be trained therewith. Accuracy in prediction by prediction engine unit 311 can thus be enhanced.

More specifically, prediction engine unit 311 predicts the stage of revision of emissions control with input data (each index) accepted from output unit 216 of information processing server 20 being defined as the feature value and provides a result of prediction as being expressed in a numerical value.

Figure 12:
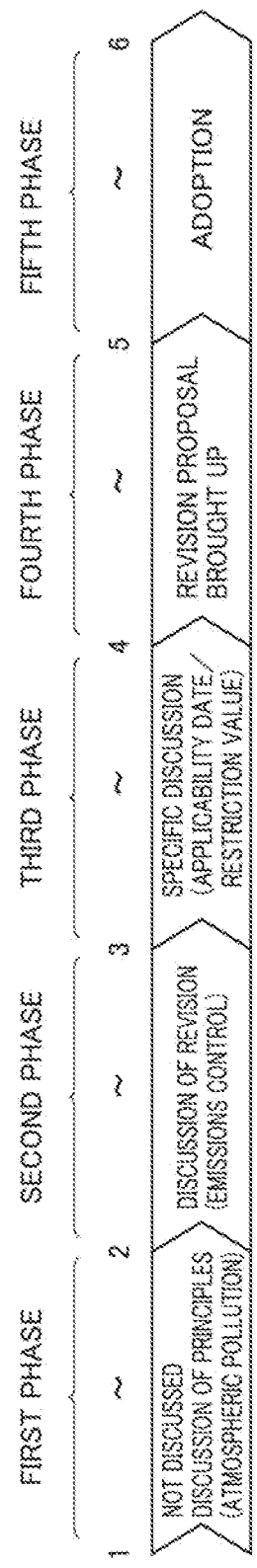
FIG. 12 is a diagram (No. 2) for illustrating each phase representing a stage of revision of emissions control.

FIGS. 11 and 12 are diagrams for illustrating each phase representing a stage of revision of emissions control. In the present embodiment, five phases are defined and prediction engine unit 311 predicts in which phase a target country is currently in.

Referring to FIG. 11, a first phase refers to a phase including a stage in which revision of emissions control has not yet been discussed. For example, a stage in which discussion of principles for improving atmospheric pollution is started which can also be regarded as a preparatory step before emissions control is also included in the first phase. A second phase refers to a phase including a stage in which discussion of revision of emissions control has been started and principles of revision are discussed. A third phase refers to a phase including a stage in which a working group for revision of emissions control has been established (launched) and revision is specifically discussed. A fourth phase refers to a phase including a stage in which a revision proposal has been completed and the revision proposal is brought up to the Diet or the like. A fifth phase refers to a phase including a stage in which the revision proposal is adopted in both of the House of Councillors and the House of Representatives.

Referring to FIG. 12, prediction engine unit 311 provides a numerical value representing a result of prediction within a range of values from 1 to 6. In the present embodiment, prediction engine unit 311 provides a value up to one decimal place. For example, when the numerical value representing the result of prediction by prediction engine unit 311 is 3.6, it can be estimated that a target country is in the third phase and in an intermediate stage of specific discussion of revision of emissions control.

Prediction engine unit 311 provides information representing the stage of revision of emissions control to output unit 312.

Output unit 312 provides information representing the stage of revision of emissions control received from prediction engine unit 311 to display apparatus 50. Display apparatus 50 shows the stage of revision of emissions control. The stage of revision of emissions control is thus shown.

FIG. 13 is a diagram for illustrating a result of prediction of the stage of revision of emissions control. In the example shown in FIG. 13, results of prediction of the stage of revision of emissions control in countries A to D are shown.

For country A, a result of prediction of 1.0 is shown. This shows that country A is in the first phase and is predicted as not having discussed revision of emissions control. For country B, a result of prediction of 2.7 is shown. This shows that country B is in the second phase and is predicted as discussing principles of revision of emissions control. For country C, a result of prediction of 3.2 is shown. This shows that country C is in the third phase and is predicted as being specifically discussing revision of emissions control. For country D, a result of prediction of 2.8 is shown. This shows that country D is in the second phase and is predicted as discussing principles of revision of emissions control. In the present embodiment, the result of prediction is shown with a numerical value, so that it can be seen that, even in the same second phase, country D is slightly more advanced in stage of revision than country B. Thus, preparation can be done and measures can be taken more properly for revision based on the result of prediction.

Instead of or in addition to the numerical value, characters representing the stage may be shown as the result of prediction of the stage of revision of emissions control. In this case as well, even in the same phase, contents of characters may be different depending on the numerical value.

As set forth above, in prediction system 1 according to the present embodiment, information collection server 10 obtains relevant information relating to emissions control from external server group 7 and local server 8. Then, information processing server 20 converts each piece of relevant information obtained by information collection server 10 into the index relating to the degree of influence on revision of emissions control. Then, prediction creation server 30 predicts the stage of revision of emissions control with the resultant index being defined as input data. The relevant information collected by information collection server 10 is not used as it is as input data to prediction creation server 30 but each piece of relevant information is converted to the index relating to the degree of influence on revision of emissions control and the index is adopted as input data to prediction creation server 30. Revision of emissions control can thus be predicted more accurately than in an example in which the relevant information is adopted as it is as input data to prediction creation server 30.

Prediction creation server 30 is trained, with the index relating to the degree of influence on revision of emissions control being used as training data. As prediction creation server 30 is trained with the index relating to the degree of influence on revision of emissions control, improvement in accuracy in prediction by prediction creation server 30 is expected as compared with an example in which prediction creation server 30 is trained with the relevant information as it is. By training prediction creation server 30 with the index relating to the degree of influence on revision of emissions control, accuracy in prediction by prediction creation server 30 can be higher than in an example in which the relevant information is used as it is as training data for prediction creation server 30.

In prediction system 1 according to the present embodiment, the relevant information includes observation data. Then, information processing server 20 converts the collected observation data (results of observation of the PM concentration) into four indices. The four indices are (1) point P resulting from conversion of annual average value Ave of the PM concentration, (2) difference ΔAve between annual average value Ave and annual average value Ave1 in a previous year, (3) integrated value S over a month of the PM concentration exceeding reference value ath, and (4) the number of excess days D in a month on which the PM concentration exceeds reference value ath. The observation data is converted to the four indices relating to the degree of influence on revision of emissions control and the four indices are employed as training data and input data for prediction creation server 30. Revision of emissions control can thus be predicted more accurately than in an example in which observation data which is not information directly involved with revision of emissions control is employed as training data and input data for prediction creation server 30.

In prediction system 1 according to the present embodiment, the relevant information includes media report data. Then, information processing server 20 converts the importance rank of each piece of collected media report data into a point and calculates a monthly average of points. The media report data is converted to the index (the monthly average) relating to the degree of influence on revision of emissions control and the index is employed as training data and input data for prediction creation server 30. Revision of emissions control can thus be predicted more accurately than in an example in which media report data which is not information directly involved with revision of emissions control is employed as training data and input data for prediction creation server 30.

In prediction system 1 according to the present embodiment, the relevant information includes economic index data. Then, the collected economic index data defined as the index is used as training data and input data for prediction creation server 30. The economic index data includes information on the GDP, the economic growth rate, the level of emissions control of a surrounding country, the scale of automobile markets, the number of cars per one person, and political transparency. A speed of a process of revision of emissions control may be different depending on the economic scale or the size of the automobile markets in a country. By using the economic index data as training data and input data for prediction creation server 30 for prediction of the stage of revision of emissions control, revision of emissions control can accurately be predicted.

In prediction system 1 according to the present embodiment, the relevant information includes information representing a date (date data) of revision of emissions control. Then, information processing server 20 specifies the date of previous revision of emissions control based on the collected date data and counts the number of months elapsed since the date of revision until the current time point. Then, the number of elapsed months defined as the index is used as training data and input data for prediction creation server 30. Revision of emissions control can thus be predicted more accurately than in an example in which date data which is not information directly involved with revision of emissions control is employed as training data and input data for prediction creation server 30.

In prediction system 1 according to the present embodiment, the relevant information includes control level data. Then, information processing server 20 uses the control level data and control level data of a country defined as a model case by a target country to which the control level data is applied, to calculate level difference ΔLv. Calculated level difference ΔLv defined as the index is used as training data and input data for prediction creation server 30. Revision of emissions control can thus be predicted more accurately than in an example in which control level data which is not information directly involved with revision of emissions control is employed as training data and input data for prediction creation server 30.

The observation data, the media report data, the economic index data, the date data, and the control level data shown as the relevant information in the present embodiment are merely by way of example. In addition, the relevant information may include, for example, information on a location either in the northern hemisphere or the southern hemisphere, information representing the GDP per citizen, information representing the economic growth rate, information representing trade balance, information representing car exports, information representing the total number of cars, information representing the number of cars per 1000 people, information representing new car sales in one year, information representing total energy consumption, and information representing energy consumed per citizen. By converting such information into an index in accordance with characteristics of each piece of information in information processing server 20 and employing the index as input data for trained prediction creation server 30, a stage of revision of emissions control can accurately be predicted.

Second Embodiment

In the first embodiment, an example in which prediction creation server 30 that receives the index relating to the degree of influence on revision of emissions control as input data predicts the stage of revision of emissions control is described. In a second embodiment, an example in which the prediction creation server that receives the index relating to the degree of influence on revision of emissions control as input data predicts properness of negotiation timing for revision of emissions control will be described.

Referring again to FIGS. 1 and 2, a prediction system 1A according to the second embodiment includes information collection server 10, information processing server 20, a prediction creation server 30A, storage server 40, and display apparatus 50. Information collection server 10, information processing server 20, prediction creation server 30A, storage server 40, and display apparatus 50 are connected to communication bus 60. Prediction system 1A according to the second embodiment is the same as prediction system 1 according to the first embodiment except for replacing prediction creation server 30 with prediction creation server 30A. Since prediction system 1A is otherwise similar in configuration to prediction system 1, description thereof will not be repeated.

Prediction creation server 30A predicts properness of negotiation timing for revision of emissions control based on each index received from information processing server 20. Prediction creation server 30A has display apparatus 50 show a result of prediction representing predicted properness of negotiation timing.

Prediction creation server 30A includes a controller 31A, storage 32, and communication device 33. Storage 32 and communication device 33 are similar to storage 32 and communication device 33 of prediction creation server 30 according to the first embodiment.

Controller 31A is implemented, for example, by an integrated circuit including a CPU. Controller 31A executes a program stored in storage 32. Controller 31A predicts properness of negotiation timing for revision of emissions control, for example, with each index received from information processing server 20 through communication device 33 being defined as an input.

Controller 31A includes a prediction engine unit 311A and output unit 312. Controller 31A functions as prediction engine unit 311A and output unit 312 by executing a program stored in storage 32. Output unit 312 is similar to output unit 312 of controller 31 according to the first embodiment.

Prediction engine unit 311A accepts as input data, each index from output unit 216 of information processing server 20 similarly to prediction engine unit 311 according to the first embodiment. Prediction engine unit 311A predicts properness of negotiation timing for revision of emissions control in accordance with a calculation rule constructed by training, with each index being defined as a feature value. Prediction engine unit 311A is trained to predict properness of negotiation timing for revision of emissions control from input data by what is called supervised learning in accordance with a neural network model. Prediction engine unit 311A may be trained, for example, every prescribed cycle. Since information in external server group 7 and local server 8 is updated every day, a training data set corresponding to newly added data may be prepared every prescribed cycle and prediction engine unit 311A may be trained therewith. Accuracy in prediction by prediction engine unit 311A can thus be enhanced.

The training data set used for training of prediction engine unit 311A includes a plurality of pieces of training data obtained by labeling input data obtained by combining indices provided from output unit 216 of information processing server 20 in any pattern with properness of negotiation timing. For example, input data is labeled with properness of negotiation timing by a person skilled in the art. In the second embodiment, combination of the indices in the past is labeled with whether or not negotiation timing at that time is proper. Since the index relating to the degree of influence on revision of emissions control is used as the training data, improvement in accuracy in prediction by prediction engine unit 311A (trained model) is expected as compared with an example in which collected relevant information is used as it is as training data. Upon receiving input data, the trained model trained with the training data set as above provides properness of negotiation timing for revision of emissions control.

FIG. 14 is a diagram for illustrating a result of prediction of properness of negotiation timing. In the example shown in FIG. 14, results of prediction representing whether or not negotiation timing is proper for country A to country D are shown. The negotiation timing being proper means, for example, that possibility of reflection of one's own opinions on a proposal for revision of emissions control is equal to or more than a prescribed value by negotiation with the government at current timing. The negotiation timing being improper means, for example, that specific discussion of a revision proposal is already about to end, a revision proposal has been completed, or a revision proposal has already been adopted and possibility of reflection of one's own opinions on the revision proposal is less than the prescribed value in spite of negotiation with the government at current timing.

FIG. 14 shows for country A and country D, a result of prediction that negotiation timing is proper and shows for country B and country C, a result of prediction that negotiation timing is improper. The results of prediction are shown on display apparatus 50. Whether or not to conduct negotiation about revision of emissions control at current timing can thus be determined.

In the second embodiment, prediction engine unit 311A provides reliability of the result of prediction. Prediction engine unit 311A calculates reliability based on similarity of input data to trained data (training data). For example, when input data is the same as trained data, prediction engine unit 311A calculates reliability as 100%.

In the example shown in FIG. 14, reliability of results of prediction of negotiation timing of countries A to D is calculated as 85%, 36%, 71%, and 43%. As reliability is shown together with the results of prediction, a user can more properly determine whether or not to conduct negotiation about revision of emissions control at current timing.

As set forth above, in prediction system 1A according to the second embodiment, information collection server 10 obtains relevant information relating to emissions control from external server group 7 and local server 8. Then, information processing server 20 converts each piece of relevant information obtained by information collection server 10 into an index relating to a degree of influence on revision of emissions control. Then, prediction creation server 30A predicts properness of negotiation timing for revision of emissions control, with the resultant index being defined as input data. Instead of using relevant information collected by information collection server 10 as it is as input data for prediction creation server 30A, each piece of relevant information is converted to an index relating to the degree of influence on revision of emissions control and the index is employed as input data for prediction creation server 30A. Properness of negotiation timing can thus be predicted more accurately than in an example in which the relevant information is used as it is as input data for prediction creation server 30A.

Prediction creation server 30A is trained, with the index relating to the degree of influence on revision of emissions control being employed as training data. As prediction creation server 30A is trained with the index relating to the degree of influence on revision of emissions control, improvement in accuracy in prediction by prediction creation server 30A is expected as compared with an example in which the relevant information is used as it is for training prediction creation server 30A. By training prediction creation server 30A with the index relating to the degree of influence on revision of emissions control, accuracy in prediction by prediction creation server 30A can be higher than in an example in which the relevant information is used as it is as training data for prediction creation server 30A.

[First Modification]

According to the description in the second embodiment, in addition to a result of prediction of properness of negotiation timing, reliability of the result of prediction is calculated. Similarly also in the first embodiment, in addition to the result of prediction of the stage of revision of emissions control in the first embodiment, reliability of the result of prediction may be calculated. Prediction engine unit 311 calculates reliability based on similarity of input data to trained data (training data). As reliability is shown together with the result of prediction, a user can consider use of results of prediction in consideration also of reliability.

[Second Modification]

Prediction systems 1 and 1A are described in connection with emissions control by way of example in the first and second embodiments. Prediction systems 1 and 1A may be used also for revision or institution of other legislation etc. or standards. For example, when prediction systems 1 and 1A are used for revision of safety standards for road trucking vehicles that stipulate safety standards of vehicles, information collection server 10 collects data on the number of traffic accidents and actual conditions (frequency) of use of vehicles. Then, information processing server 20 converts collected data into an index relating to the degree of influence on revision of safety standards for road trucking vehicles. Then, by using the index as input data, prediction systems 1 and 1A predict the stage of revision of safety standards for road trucking vehicles or properness of negotiation timing for revision of safety standards for road trucking vehicles.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A prediction system comprising:
   a first device that collects relevant information relating to revision of legislation, regulations, or standards;
   a second device that performs predetermined conversion processing for converting the relevant information into an index relating to a degree of influence on the revision; and
   a third device that predicts based on the index, a stage of the revision or properness of negotiation timing relating to the revision,
   wherein:
   the relevant information includes prescribed information determined as motiving the revision,
   the prescribed information includes first information which is information on media reports or research reports about atmospheric pollution, the second device includes a first trained model trained
through machine learning,
the first trained model is trained through training processing using a first training data set to provide information representing a degree of influence on the revision in response to an input,
the first training data set includes a plurality of pieces of training data obtained by labeling information on a predetermined item with information representing the degree of influence, and
the second device:
performs prescribed processing to extract the information on the predetermined item from the first information,
sets the information on the predetermined item as an input to the first trained model,
converts the information representing the degree of influence provided from the first trained model into a point by using a predetermined first function, and
sets an average value of points for a first prescribed period as the index.

2. The prediction system according to claim 1, wherein
the third device includes a second trained model trained through machine learning,
the second trained model is trained through training processing using a second training data set to provide the stage of the revision or the properness in response to an input, and
the second training data set includes a plurality of pieces of training data obtained by labeling the index with the stage of the revision or the properness.

3. The prediction system according to claim 1, wherein the prescribed information includes second information representing a result of observation of atmospheric pollution.

4. The prediction system according to claim 3, wherein the second device converts to the index, by using a predetermined second function, an average value for a second prescribed period of values shown in the second information.

5. The prediction system according to claim 4, wherein the second device sets as the index, a difference between the average value for the second prescribed period of the values shown in the second information and an average value for the second prescribed period of values shown in the second information in a previous year.

6. The prediction system according to claim 3, wherein the second device
calculates every third prescribed period, an excess over a reference value, of a value shown in the second information, and
sets an integrated value of excesses for a fourth prescribed period as the index, the fourth prescribed period being longer than the third prescribed period.

7. The prediction system according to claim 6, wherein the second device sets as the index, a number of third prescribed periods during which the value shown in the second information exceeds the reference value.

8. The prediction system according to claim 1, wherein the relevant information includes third information representing an economic index of a target country to which the legislation, regulations, or standards is/are applied.

9. The prediction system according to claim 1, wherein
the relevant information includes fourth information representing a date of revision of current legislation, regulations, or standards, and
the second device
calculates a period elapsed since revision of the current legislation, regulations, or standards based on the fourth information, and
sets the elapsed period as the index.

10. The prediction system according to claim 1, wherein
the relevant information includes fifth information representing a control level under the legislation, regulations, or standards,
a target country is a country to which the legislation, regulations, or standards is/are applied, and
the second device
calculates, by using the fifth information, a difference between a level of the legislation, regulations, or standards and a level of legislation, regulations, or standards corresponding to the legislation, regulations, or standards in a country set as a model case by the target country, and
sets the difference as the index.

11. A prediction method comprising:
collecting relevant information relating to revision of legislation, regulations, or standards;
performing predetermined conversion processing for converting the relevant information into an index relating to a degree of influence on the revision; and
predicting a stage of the revision or properness of negotiation timing relating to the revision based on the index,
wherein:
the relevant information includes prescribed information determined as motiving the revision,
the prescribed information includes first information which is information on media reports or research reports about atmospheric pollution,
the predetermined conversion processing is performed with a first trained model trained through machine learning,
the first trained model is trained through training processing using a first training data set to provide information representing a degree of influence on the revision in response to an input,
the first training data set includes a plurality of pieces of training data obtained by labeling information on a predetermined item with information representing the degree of influence, and
the predetermined conversion processing includes:
performing prescribed processing to extract the information on the predetermined item from the first information,
setting the information on the predetermined item as an input to the first trained model,
converting the information representing the degree of influence provided from the first trained model into a point by using a predetermined first function, and
setting an average value of points for a first prescribed period as the index.

\* \* \* \* \*